United States Patent [19]
König

[11] Patent Number: 5,123,336
[45] Date of Patent: Jun. 23, 1992

[54] PLANT FOR TREATING BAKING GOOD

[76] Inventor: Helmut König, A-8045 Graz, Statteggerstrasse 80, Austria

[21] Appl. No.: 613,814

[22] PCT Filed: Nov. 27, 1989

[86] PCT No.: PCT/AT89/00111
§ 371 Date: Jan. 8, 1991
§ 102(e) Date: Jan. 8, 1991

[87] PCT Pub. No.: WO90/06057
PCT Pub. Date: Jun. 14, 1990

[30] Foreign Application Priority Data
Nov. 28, 1988 [AT] Austria ................. A 2926/88

[51] Int. Cl.$^5$ ............... A21B 1/42; A21B 3/00;
A21B 3/07; A21B 7/00
[52] U.S. Cl. .................. 99/355; 99/357;
99/443 C; 99/427; 99/470; 126/21 A; 432/133
[58] Field of Search ............ 99/443 R, 443 C, 352,
99/386, 483, 470, 427, 355, 357; 198/820;
126/21 A; 219/388, 393; 432/133, 126, 128;
414/902, 907

[56] References Cited

U.S. PATENT DOCUMENTS

| | | | |
|---|---|---|---|
| 4,034,119 | 7/1977 | Kanbe et al. | 99/355 |
| 4,202,259 | 5/1980 | Johansson | 99/443 R |
| 4,204,466 | 5/1980 | Schnee | 99/443 C |
| 4,244,285 | 1/1981 | Baker | 219/388 |
| 4,517,447 | 5/1985 | Hicks | 432/128 |
| 4,701,340 | 10/1987 | Bratton et al. | 126/21 A |
| 4,726,766 | 2/1988 | Stewart et al. | 432/133 |
| 4,751,877 | 6/1988 | Andersson | 99/443 C |
| 4,792,303 | 12/1988 | Stewart et al. | 126/21 A |
| 4,834,063 | 5/1989 | Hwang et al. | 99/443 R |
| 4,944,218 | 7/1990 | Cresson | 99/443 C |

FOREIGN PATENT DOCUMENTS

| | | |
|---|---|---|
| 570527 | 2/1933 | Australia . |
| 549123 | 7/1933 | Australia . |
| 346267 | 11/1978 | Australia . |
| 376106 | 10/1984 | Australia . |
| 3330693 | 3/1985 | Fed. Rep. of Germany . |

Primary Examiner—Timothy F. Simone
Attorney, Agent, or Firm—Remy J. VanOphem

[57] ABSTRACT

A plant for treating baked goods having a baking oven, two fermentation compartments and a cooling tower which constitute a treating compartment for the goods to be treated. Support members carrying the baking goods are fed to the treating compartments by a horizontal conveyor which extends below all of the treating compartments and protrudes on both sides beyond the outermost treating compartment and constitutes stations for charging or, respectively, taking off of the dough pieces. In each treating compartment the support members are guided in a pile upwardly and in a further pile downwardly. The single treating compartments or, respectively, their housings are very close to each other to keep space requirements of the plant to a minimum.

11 Claims, 3 Drawing Sheets

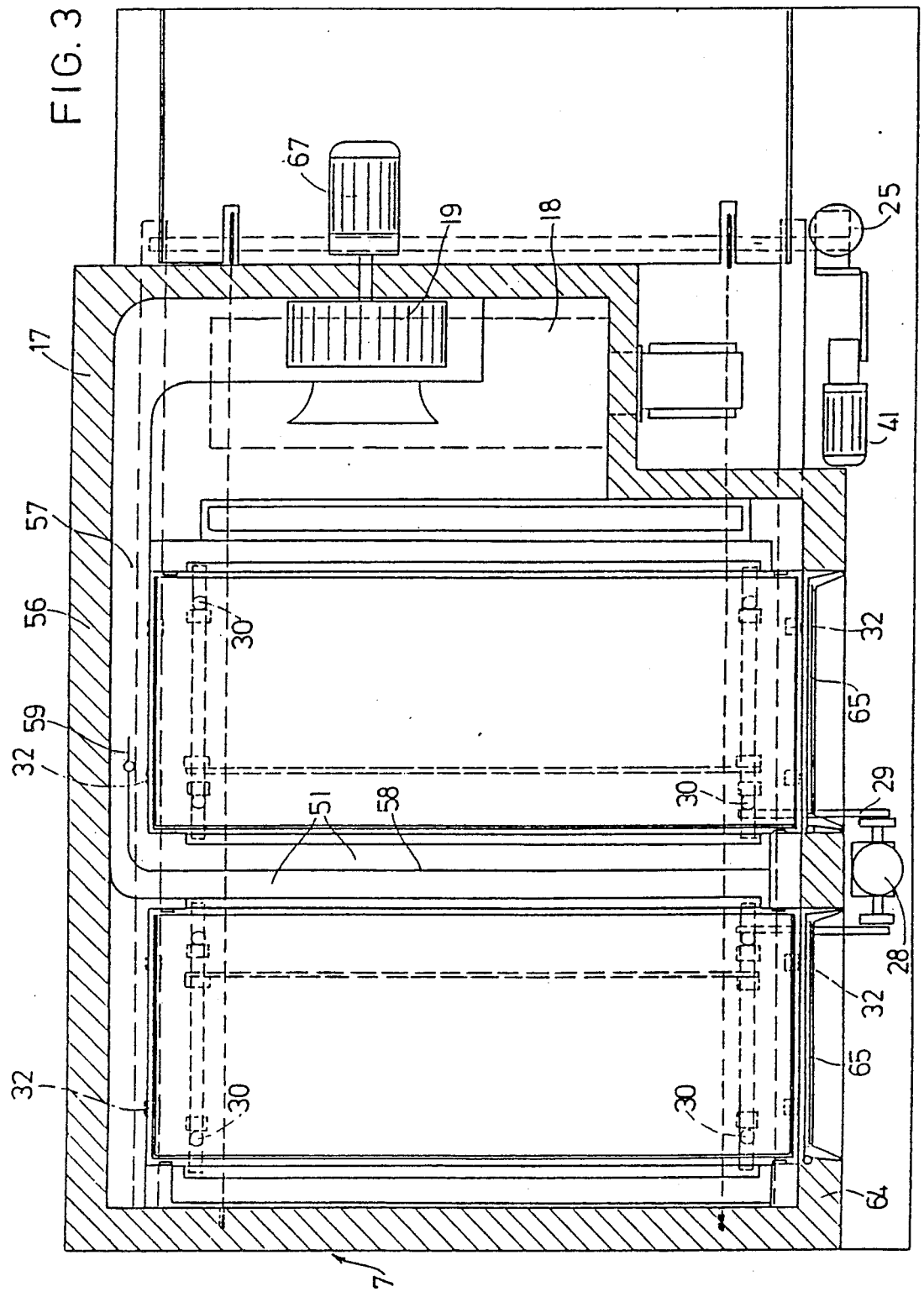

PLANT FOR TREATING BAKING GOOD

BACKGROUND OF THE INVENTION

1. Field of the Invention

The invention relates to a plant for treated baked goods, which has a baking oven having at least one treating compartment for the baking goods and a heat-insulated baking chamber. The baking goods are carried through the heat-insulated baking chamber by a first conveyor device which transports support members lying in a pile one above the other vertically. The support members are delivered up in the baking chamber one after the other by a delivery device to a second conveyor device which transports the support members lying in a pile one above the other in the baking chamber to below again. Each conveyor has an elevating or, respectively, lowering device acting on the respective pile for stepwisely upward or, respectively, downward motion of the support members, top which an elevating or, respectively, lowering device is related which fixes the pile during a part of this motion. A horizontal conveyor is movable in both directions and is disposed below the piles. A station is disposed outside the treating compartment, on which station the baking goods carried by the support members can be laid onto the conveyor or, respectively, can be taken off from the conveyor. Openings in two opposing walls of the baking oven are provided through which openings the support members can be introduced into the baking oven or, respectively, can be taken out from the baking oven by the conveyor.

2. Description of the Prior Art

Baking ovens for a plant of the above described kind are known from German patent specification 570,527, German patent specification 549,123, Austrian patent specification 376,106, and German Offenlegungsschrift 3,330,693. A plant provided with such a baking oven is the subject of an older proposal of the applicant and has the advantage of a compact construction which can be operated in different manners. When operated by hand, the support members carrying the baking goods are laid onto the conveyor at the same position to which the completely baked baking goods are brought back by the conveyor. Introduction to and removal of the baking goods from the baking chamber is done through the same opening of the baking oven. When operating continuously in an industrial scale, however, as a rule it is more favorable to introduce the baking goods to be baked into the baking oven on the one side thereof and to take off the completely baked baking goods at the other side of the baking oven, so that a continuous operation of the baking oven is achieved. In both cases, however, the baking goods must be displaced by hand or mechanically before being introducing into the baking oven or, respectively, after passing through the baking oven, in order to effect the process steps anteceding the real baking process or following it, for example a fermentation or forming of the dough pieces before the baking process or, respectively, a cooling of the baking goods after the baking process before packing the baking goods. This displacement of the baking goods requires considerable time and work, if it is done by hand. If the displacement of the baking goods is done automatically, the required machine expenditure is considerable and the apparatus necessary to carry out the process steps is comparatively room-consuming. A completely automatically operating plant, therefore, is expensive and requires considerable space in the baker's working room, which space is not always available.

SUMMARY OF THE INVENTION

The invention has as its object to improve a plant of the initially described kind so that the plant can be operated in a versatile manner, yet keep the space requirements extremely low. The invention achieves this objective by providing at least one further treating compartment for the baking goods following the baking oven which is surrounded by a separate heat insulating housing and which is different from the treating compartment of the baking oven. For example, at least one fermentation compartment, at least one cooling tower, or at least one baking oven is provided, if desired with different baking atmospheres. All of the treating compartments are provided with similar conveyors moving the support members in piles upwardly or, respectively, downwardly, with the conveyor being common for all treating compartments and extending below the row of all treating compartments. A programmable control system is provided for conveying the support members on the conveyor to the respective desired treating compartment. In this manner the plant can be automatically operated in an extremely versatile manner. For example, the support members carrying portioned and formed dough pieces can be introduced into a fermentation compartment and can e subsequently delivered on the same support members to the baking oven neighboring the fermentation compartment. A cooling tower forming a cooling compartment can follow the baking oven, if a cooling of the baking goods (for example by blowing with cool air) or, if desired, even an intensive cooling, for example a deep cooling, is required before the baking goods are packed. During these treatment steps the baking goods always remain on the same support member and, therefore, do not need to be put off. The support members which are controlled by a program are transported by the horizontal conveyor at the shortest distance always to that treating compartment on which the respective following treating step should be done. Suitable programmed control devices are known so that designing a suitable control devices is possible without any problem. It is also of advantage that the conveyors disposed in the several treating compartments and transporting the support members up and down are equal to each other or, respectively, at least similar to each other (for example—without changing the principle of the conveyors—the heights of the single treating compartments may differ from each other), so that not only is a unitary conveyor system at the disposal in each treating compartment, but also the plant costs are reduced when compared with a plant having different conveyor systems.

In the first baking room of two subsequent baking rooms seen in the direction of travel of the baking goods, a gentle baking of the baking goods can be effected and in the second baking room can be completed. In two fermentation compartments following each other a pre-fermentation and a subsequent fermentation of the baking goods can be done.

Of course the further treating compartments (fermentation compartments, cooling compartments, baking compartments) must not always be present; on the contrary, the plant will always be adjusted to the respective requirements given. A later enlargement or, respectively, change, however, is possible with minimal effort, because only the newly introduced plant elements must be inserted, the horizontal conveyor running under the treating compartments adjusted to the new length, and the program of its control device adjusted to the new requirements.

In all cases a considerable savings of space is achieved due to the fact that the single treating compartments can be disposed closer to each other, if between the single treating compartments no further process steps of the baking goods are required, such as a forming of the baking goods between pre-fermentation and complete fermentation and the like. In such cases the stations necessary for these treatments of the baking goods can be disposed between individual compartments without deviating from the working principle of the inventive plant.

Further, it is advantageous that the plant can be operated from both sides, that is from both front ends of the horizontal conveyor, if desired, or also from the center of the plant. Therefore, the position of charging of the plant can be chosen as freely as the position of taking off the ready baked dough pieces, and it is also possible to change the position of charging or, respectively, the position of taking off later on, if the program is correspondingly adapted. Thereby the plant can be adjusted to the respective conditions occurring in the bakery in an optimal manner. As a rule, however, charging of the plant will be done from one front end thereof, where taking off is also done; if a continuous operation is not desired, taking off is done at the other front end of the plant. According to a further embodiment of the invention it is suitable in these cases to provide the conveyor with a prolongation extending beyond the respective first, or respectively, last treating compartment of the row of treating compartments, for suitably positioning the charging station or, respectively, the taking off station.

From the Austrian patent specification 346,267 it is known to feed full charging members by utilization of a conveyor belt to a row of multi-stage baking ovens disposed side by side, and to remove the empty charging members from the multi-stage baking ovens by means of a further conveyor belt. In each case, the two conveyor belts are disposed spaced apart before the row of the multi-stage baking ovens, so that such conveyor belts cannot be used in the sense of the invention. Furthermore, the conveyor belts in this known plant always move in the same direction, whereas according to the present invention one conveyor belt is moved in both directions and serves for feeding as well as for conveying off of the support members carrying the baked goods.

According to a further embodiment of the invention, for baking tin loafs the support members can be formed by boxes, noting that at at least one of the two stations suitable devices are provided for putting on or, respectively, off covers related to the boxes.

Further objects and features of the invention will become more apparent from a reading of the following detailed description thereof taken in conjunction with the drawings appended hereto.

BRIEF DESCRIPTION OF THE DRAWINGS

FIG. 3 is a horizontal sectional view taken along line III—III of FIG. 2.

DETAILED DESCRIPTION OF THE PREFERRED EMBODIMENT

Figure 1:
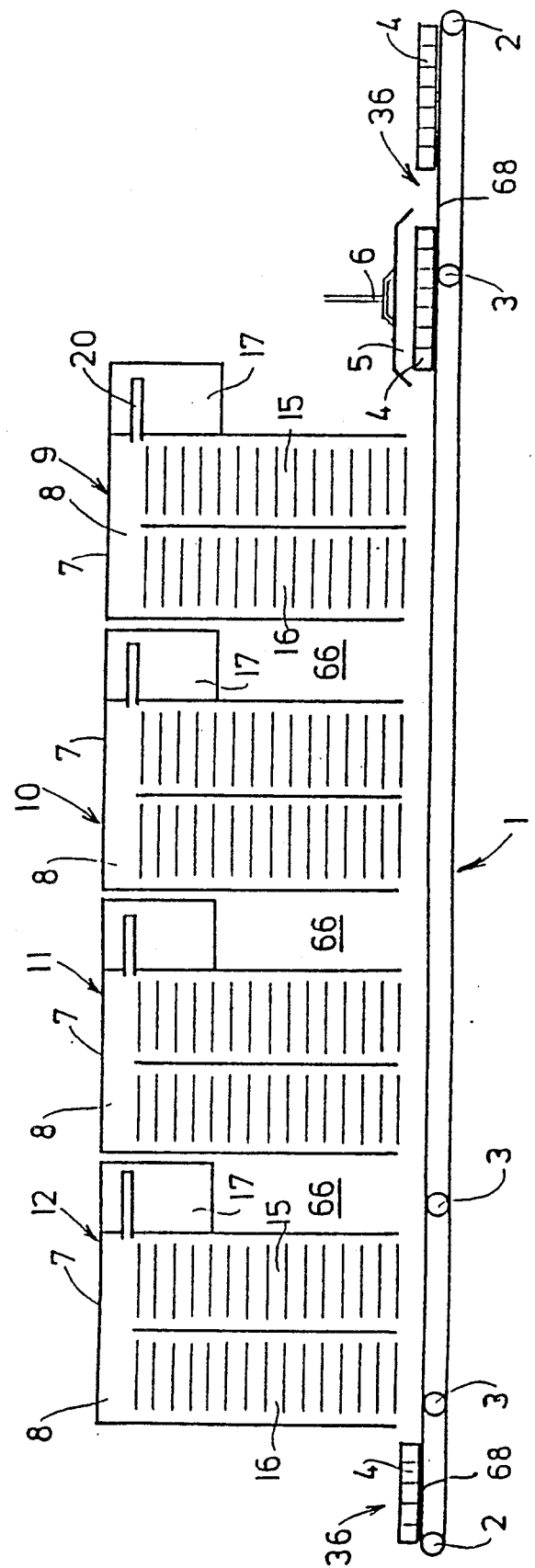
FIG. 1 is a schematic illustration of a plant provided with a baking oven, two fermentation compartments and a cooling tower in accordance with the present invention.

The plant according to FIG. 1 has a horizontally disposed conveyor 1 formed by endless conveyor chains guided over guide wheels 2 at the two front ends of the conveyor 1. Divided over the length of the conveyor 1 there are provided a plurality of supporting rollers 3 in a frame (not shown) of the plant in order to avoid a sag of the conveyor 1. The conveyor 1 transports support means 4 for the baking goods, which in FIG. 1 are shown as boxes for baking of tin loafs. The support means 4 may be covered by cover 5 which can be put on or, respectively, taken off by suction means 6, for example suction cups. Above the conveyor 1 a plurality of treating compartments 8 are disposed in housings 7 which suitably are heat-insulated, for different treatments of the baking goods. The outermost right-hand treating compartment 8 in FIG. 1 is formed by a baking oven 9, which is followed by two fermentation compartments 10 and 11 and a cooling tower 12, one after the other. Two conveyor means 13 and 14 (FIG. 2) are provided for each treating compartment 8 from which the conveyor means 13 transports the support means 4 lying in a pile 15 one above the other in the respective treating compartment 8 to above, whereas the conveyor means 14 transports the support means 4 lying in an adjacent pile 16 in the treating compartment 8 one above the other to below, these two movements being suitably effected stepwisely. Construction and function of the conveyor means 13 and 14 will be described in detail later on.

In a box 17 adjoining the housing 7 means are provided for creating a certain atmosphere in the respective treating compartment 8, for example, in case of the baking oven 9, a heating means 18 and a blower means 19. Further, this box 17 receives a delivery means 20 which delivers the support means 4 one after the other from the upper end of the upwardly moving pile 15 to the upper end of the downwardly moving pile 16. The delivery means 20, for example, may be formed by a pneumatic cylinder 21 (FIG. 2), the piston rod 22 of which creates the shifting motion of the support means 4. A stop switch 23 (FIG. 2) senses that during the shifting motion the support means 4 has reached the correct end position and releases the downward motion of the pile 16 only if this end position is reached. In an analogous manner, sensing means 24 are provided at the lower end of the upwardly transported pile 15 which checks whether the support means 4 feeded by the conveyor 1 below the pile 15 is correctly positioned. If the support means protrudes to before or behind (seen in the moving direction of the conveyor 1), one of the sensing means 24 is actuated and interrupts the drive means for moving the support means 4. The drive means for the conveyor 1 has a motor 25 (FIG. 2), which together with a variable gear 26 is controlled by a programmable control means 27 shown only schematically so that the support means can be feeded by the conveyor means 1 to any desired pre-selected position with respect to the several treating compartments 8.

Thereby it is possible to subject the dough portions carried by the support means 4 to any desired treatment.

In order to transport the support means 4 in the treating compartments 8 upwardly and downwardly, a motor 28 is provided for each treating compartment 8, which motor actuates the conveyor means 13 and 14. For this, the motor 28 acts via a linkage with eccentrics 29 and two lifting plungers 30 movably guided in a vertical direction in a bottom plate 31 of the respective treating compartment 8. These lifting plungers 30 grip the support means 4 feeded by the conveyor 1 and positioned below the pile 15 from below in the region of its four corners and lift the support means 4 into contact with the support means lying in the pile 15 one above the other. Simultaneously, the complete pile 15 is lifted for the height of a support means 4. When the lifting plungers 30 are retracted, a downward slide of the support means 4 within the pile 15 is avoided by stop pawls 32 (FIG. 3) engaging into the side wall of the lowermost support means 4. After backward motion of the lifting plungers 30, therefore, the next support means 4 can be brought into the feeding positions below the pile 15 and can be lifted upwardly by the lifting plungers 30, this support means 4 engaging directly the superimposed support means 4 from below. In this manner, when the treating compartment 8 is charged, in this compartment a pile of support means 4 is formed which directly lie one above the other, which process is repeated until the uppermost support means 4 of this pile 15 reaches the height of the delivery means 20 by which it is shifted towards the adjacent compartment of the treating compartment 8, in which the support means 4 in the pile 16 are transported downwardly. For facilitating this shifting movement effected by the delivery means 20 guide rails may be provided in the treating compartment 8 for the support means 4 to be delivered from the right-hand compartment into the left-hand compartment of the treating compartment 8. In the left-hand section of the treating compartment 8 the support means are transported stepwisely downwards by the conveyor means 14 which have substantially the same construction as the conveyor means 13. Fixing means formed by the stop pawls 32 (FIG. 3) are also provided for this motion, which pawls stepwisely ensure the height position of the support means. The respective lowermost support means 4 in the left-hand section of the treating compartment 8 is again put from this section onto the conveyor 1 and, according to the program chosen, is transported by the conveyor 1 either again to the right-hand section of the treating compartment 8, if further travel through the treating compartment 8 is desired for the support means 4, or the support means 4 is transported out of the treating compartment 8 through an output opening 33. The output opening 33 as well as an intake opening 34, may be closed by a flap 35 which is opened only if a support means is positioned directly before the respective opening and is to be introduced or, respectively, put out through this opening. An escape of atmosphere of the baking compartment into the bakery is thereby avoided.

The support means taken off from the baking oven 9 is brought by the conveyor 1 according to the program of the control means 27 to the next treating compartment 8 (FIG. 1), for example to the cooling tower 12 where the baking goods are cooled down in a suitable manner.

In front of the intake opening 34 and in front of the front wall of the box 17 there is a station 36 for charging or, respectively, putting off the support means 4. For this purpose, the conveyor 1 at this location protrudes with an elongation 68 on the front side beyond the outermost treating compartment 8 for a corresponding distance. At the station 36 a dumping means 37 (FIG. 2) may be provided, for example in the form of a console which is swivellable around a horizontal axis 38, such that the completely treated baking goods feeded onto the respective support means 4 slide on a transversely running conveyor belt 39 when the console is dumped. The support means at the same time fixed, is after dumping back the dumping means 37 again ready for a new take-up of baking goods which at the station 36 can be put on the support means 4 by hand or automatically, for example, by means of a releasable band 42, which is particularly disposed transversely to the longitudinal direction of the conveyor 1. The horizontal axis 38 of the dumping means 37 can be formed by the axis of the guide wheels 2 of the conveyor 1, and the dumping means 37 can be actuated by a motor 41 via an eccentric drive 40, which motor can also be controlled by the control means 27.

A further charging or, respectively, discharging station 36 is provided at the other front end of the chain of treating compartments 8, where the conveyor 1 also protrudes for a corresponding distance beyond the last treating compartment 8 or, respectively, its housing 7. In this manner, it is possible to charge or, respectively, discharge the chain of treating compartments from both front ends at choice. The two stations 36 may, but must not, be identical with each other. Further, it is possible, as FIG. 1 shows, to design the station 36 disposed at the one front end broader than the station disposed at the other front end of the conveyor 1, for example, in order to provide space for a means to put on or, respectively, a means to put off the cover 5, provided with the suction means 6.

However, the station 36 serving to put the baking goods onto the conveyor 1 and, respectively, or the station 36 serving to take off the readily baked goods may also be disposed in interspaces 66 between adjacent housings 7 of two treating compartments 8. As FIG. 1 shows, such an interspace 66 is created automatically if the boxes 17 are laterally fixed to the respective housing 7. Otherwise the interspace can be made or, respectively, increased by separating two adjacent housings 7 for accommodation of the station 36. Likewise, it is possible to dispose stations of a different kind, for example forming stations for the dough pieces, within the interspace 66. The corresponding movements of the conveyor 1 are easily achieved by adjusting the program of the control means 27.

Figure 2:
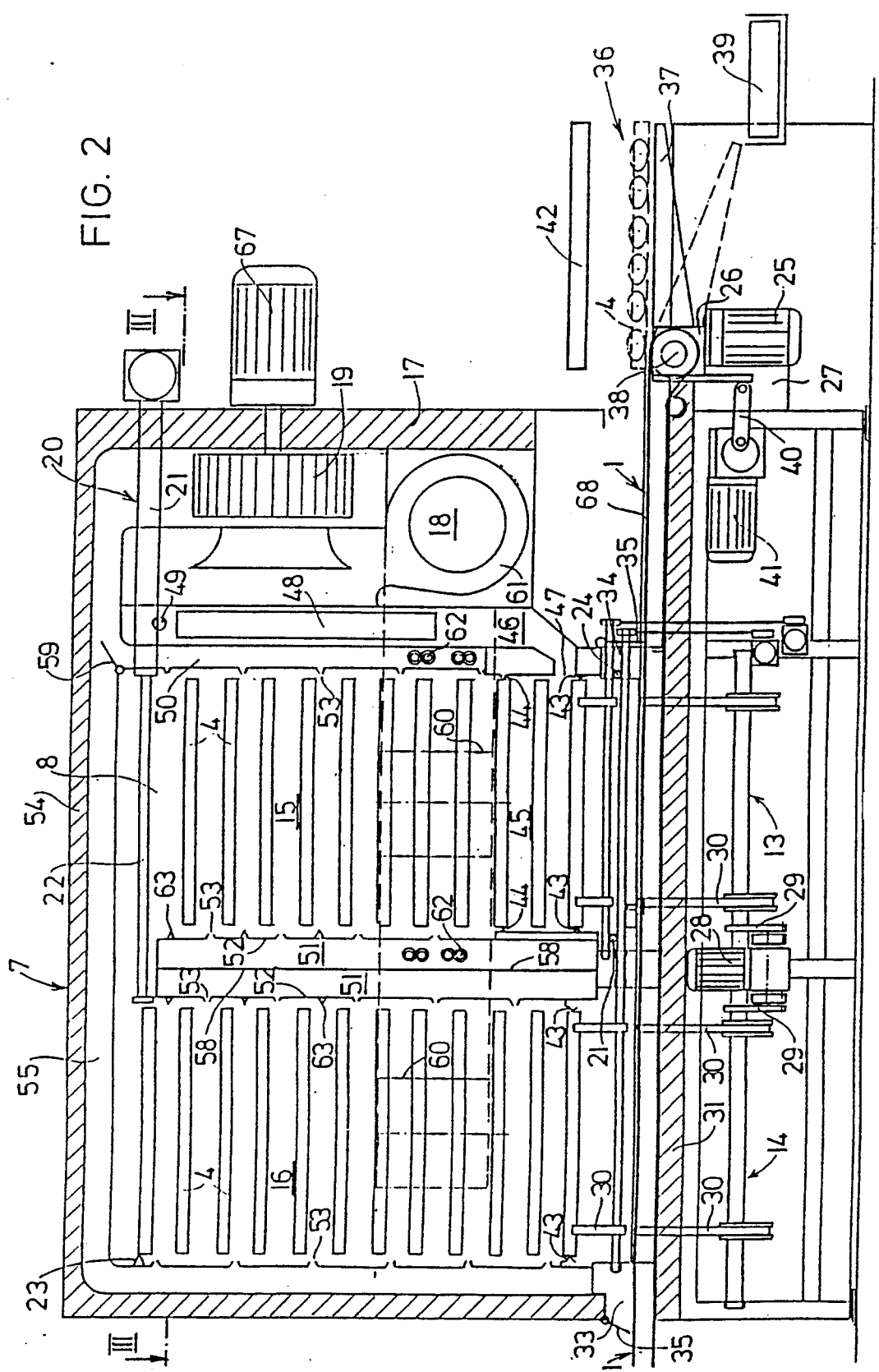
FIG. 2 is a vertical sectional view at an enlarged scale of the end of the plant illustrating the baking oven with charging station depicted at the right-hand side of FIG. 1.

Also, in the other treating compartments 8 (FIG. 1) there are conveyor means 13 and 14 provided in an analogous manner to the design described by way of FIG. 2, for upward or, respectively, downward movement of the support means 4 in the piles 15 and 16, the two conveyor means 13 and 14 working in synchronizm, however time-shifted relatively to each other, and correspondingly also the stop pawls 32 associated with the two piles 15 and 16. The motion of these stop pawls in the path of movement of the support means 14, or, respectively, in the locking position and the subsequent retraction for release of the lifting motion or, respectively, lowering motion of the support means 4, is done by a geared motor (not shown) with eccentric drives. The geared motor is synchronized with the geared motor 28 for the movement of the lifting plungers 30 such that the movement of the lifting plungers is harmonized with the movement of the stop pawls 32 or vice versa.

In order to avoid hot air from escaping from the treating compartment 8 of the baking oven (FIG. 2) into the bakery when the support means 4 are introduced or put out, additional seals 43 are provided in addition to the flaps 35, which seals resiliently engage the frame of the lowermost support means 4 of the pile and, for example, are formed by springy metallic tongues or by rubber strips. Further, highly disposed and analogously designed seals 44 can be provided at the pile 15, the support means 4 of which move upwardly. Between the two seals 43 and 44 of the pile 15 a tightly closed chamber 45 is formed, into which emerges a vapor supply line 46 via an opening 47. The vapor streaming in the vapor line 46 is created by means of a humidifying means 48 to which water is sprayed by means of a spraying nozzle 49. In the chamber 45 the baking goods are first subjected to steam only so that the dough piece can perform the so-called oven-fermentation in the baking oven 9, without being subjected to streaming air. Only after being conveyed over the upper seals 44 are the dough pieces transported into the real baking chamber in which the dough pieces are heated by a stream of heated air for the first time, which stream cannot reach the chamber 45. Air supply channels 50 and 51 disposed laterally to the two piles 15 and 16 serve to supply the hot air, the air supply channel 51 being delimited by a double wall 52 disposed centrally between the two piles 15 and 16, whereas the channels 50 are disposed outside. The air supply channels 50 and 51 have air access openings 53 in the form of slots, associated with the two piles 15 and 16, which openings at the two sides of each pile 15 and 16 are staggered relative to each other in a vertical direction always for the height of a support means 4. Suitably, the cross section of each of the air access openings 53 can be varied. The staggered disposal of the air access openings 53 permits the air between two adjacent support means 4 to be blown in an alternating direction between the support means so that all dough pieces are equally subjected to the hot air. By adjusting the size of the cross section of the air access openings 53 the air supply can be adjusted according to the baking goods to be treated. The hot air streams to the two outer air supply channels 50 via an air channel 55 extending along the top wall 54 of the baking oven 9, which air channel is connected to the pressure side of a blower of the blower means 19 driven by a motor 67, under which blower the heating means 18 is disposed. The hot air supply to the two inner air supply channels 51 separated from each other by a center wall 58 is done via an air channel 57 extending along one side wall 56 (FIG. 3) of the baking oven 9, which air channel also is connected to the pressure side of the blower means 19. In the two air channels 55 and 57 distribution means formed by swivellable flaps 59 (FIGS. 2, 3) are disposed for a rough adjustment of the distribution of the air amounts supplied to the two air supply channels 50 and 51. The fine adjustment of the air amounts escaping from the air access openings 53 is accomplished by changing the cross section of these openings.

For sucking off the air from the two sections of the treating compartment 8 accommodating the two piles 15 and 16, a suction opening 60 (FIG. 2) is provided in each side wall 56. The two openings 60 are connected to a common air withdrawal channel 61 leading along the side wall 56 of the baking oven to the heating means 18 or, respectively, to the suction side of the blower means 19.

In order to realize different temperature zones along the path of the support means in the baking oven 9, electric auxiliary heater elements 62 are disposed before some of the air access openings 53, which heater elements are switched on according to the demand.

Spraying nozzles 63 can be disposed along the double wall 52 by means of which the dough pieces resting on the support means 4 can be sprayed with a liquid, particularly water, if desired.

On a side wall 64 of the housing 7 opposing the side wall 56 doors 65 are provided (FIG. 3) through which the sections of the treating compartment 8 accommodating the piles 15 and 16 of the support means 4 are accessible.

For the other treating compartments 8, as for the two fermentation compartments 10 and 11 and for the cooling tower 12 (FIG. 1), the design within the housing 7 of the corresponding treating compartment 8 is similar, in that means there are also two conveyor means 13 and 14 provided which are disposed side by side, each of which transport a pile 15 and 16 of support means 4 lying one above the other in the treating compartment 8 to above or to below. Also, the disposal and the design of the delivery means 20 is the same as depicted in FIG. 2. Only the climatic conditions in the respective treating compartment 8 differ. Thus, at the two fermentation compartments 10 and 11 means known per se are provided within the housing 7 by which in each fermentation compartment the respective desired atmosphere is maintained. Of course, the plant does not need to have two fermentation compartments, if it is not necessary for the particular application. Rather, two fermentation compartments will generally be provided if either very long fermentation times are desired for the dough pieces and the fermentation times are not to be obtained by one single fermentation compartment (if desired in a plurality of cycles), or if different fermentation times for the dough pieces are desired which also cannot be handled by one single fermentation compartment, or if different climatic conditions are desired for two fermentation processes, for example for a pre-fermentation and a final fermentation (with reference to a forming process acting on the dough pieces, for example producing a star on the dough piece). Also, if desired, more than one single cooling tower 12 can be provided for better accommodation of different cooling conditions.

As FIG. 1 shows, the housing 7 or, respectively, the boxes 17 fixed thereto, are closely neighboring each other in order to keep the total length of the plant as short as possible. Therefrom it is only deviated if between single operations related to the several treating compartments 8 and acting on the dough pieces, further such operations are necessary which cannot be done in treating compartments 8, for example a forming operation of the dough pieces (long rolling, star-making, cutting-in and the like) and if for the machines necessary therefor the interspaces 66 (FIG. 1) between the adjacent housings 7 below the boxes 17 are not roomy enough.

An examplative operation of such a plant can be as follows: The support means 4 formed by baking plates are charged at the station 36 lying on the right-hand as viewed in FIG. 1 and are subsequently introduced by the conveyor 1 into the baking oven 9, where they are guided upwardly in the pile 15 in the treating compartment 8, whereafter they are delivered by the delivery means 20 to the pile 16 and are then brought again to the conveyor 1 which again takes up the support means one after the other and again conveys them back to the station 36 lying to the right-hand as viewed in FIG. 1 where the support means provided with the completely baked dough pieces are put off or the dough pieces are laid from the support means onto the conveyor belt 39 by the dumping means 37.

Another kind of operation is to charge the support means at the station 36 lying to the right-hand in FIG. 1, then to introduce the support means 4 by the conveyor 1 into the pile 15, to deliver the support means to the pile 16 and lastly to convey them by the conveyor 1 to the station 36 lying at the left-hand in FIG. 1 where the baking goods are taken off or tipped off from the support means 4 or taken off in another manner. The empty support means is then brought back to the station 36 disposed at the right-hand in FIG. 1 by the conveyor 1 and is charged again.

If at the plant a fermentation of the dough pieces before the baking process is desired, the support means 4 are guided through a fermentation compartment or, respectively, through both fermentation compartments 10 and 11 before they are conveyed to the pile 15 of the baking oven 9.

It is suitable to operate the plant shown in FIG. 1 so that the station 36 lying to the right-hand in FIG. 1 serves for an automatic charge of the support means 4, whereas charging at the station 36 lying to the left-hand in FIG. 1 is done by hand. For example, the support means 4 can be guided from the latter station 36 at first into fermentation compartment 10 to its pile 15, wherefrom the support means, after having passed the treating compartment 8 of the fermentation compartment 10, is again delivered from its pile 16 to the conveyor 1 and then guided to the baking oven 9 which is passed as described earlier. The output of the completely baked dough pieces is made again at the station 36 lying to the left-hand in FIG. 1.

For producing tin loafs the process may be so that the plant is supplied with the baking boxes charged with the dough portions at the station 36 lying to the left-hand in FIG. 1. The baking boxes are then transported by the conveyor 1 to the station 36 lying to the right-hand in FIG. 2, where the covers 5 are put onto the baking boxes by means of the suction means 6. Thereafter the baking boxes provided with the covers are guided by the conveyor 1 to one of the fermentation compartments 10 and 11, and then to its upwardly moving pile 15. As soon as the baking boxes have passed the fermentation compartment, they are guided by the conveyor 1 to the baking oven 9 and, after having passed it, are brought back to the station 36, where by means of the suction means 6 the cover 5 is put off from each baking box. The support means 4 without the covers is then guided at the station 36 from the suction means 6 to the dumping means 37 (FIG. 2), where the baked tin loafs are discharged from the boxes (support means 4) without actuating the dumping means. The empty baking boxes are guided by the conveyor 1 into the cooling tower 12 and are guided through its treating compartment 8. After having passed the cooling tower 12, the empty support means is again brought back to the station 36 lying to the left-hand in FIG. 1 and is charged again, whereupon the cycle starts anew.

By a suitably selected program of the control means 27 by which the transport of the support means 4 on the conveyor 1 and through the treating compartments 8 is controlled, it is possible to achieve very short cycle-times so that the efficiency of the plant can be substantially increased in comparison to known plants. Further, in comparison with known plants there results a substantial reduction of the space requirement and a reduction of the parts of the atmosphere (vapor, hot air and the like) escaping from the housings 7. The last named advantage is achieved by utilization of seals 43 and 44 forming a sluice in cooperation with the flaps 35 and can be still further increased by the design that the housings 7 contact each other, if desired, so that the output opening 33 of the one housing 7 simultaneously is the intake opening 34 of the adjacent housing or vice versa.

It will be apparent to those skilled in the art that numerous variants of the described plant are possible. For example, more than one rising and falling pile 15 and 16 can be provided in one or more of the treating compartments 8, particularly then if importance is attached to long treatment times (for example in fermentation compartments). Accordingly, it is intended that the scope of the invention only be limited in accordance with the claims appended hereto.

What is claimed is:

1. A plant for treating goods for baking comprising:
   a first insulated housing defining a first compartment; a second compartment adjacent to said first compartment; and a means for baking said goods for baking as said goods for baking proceed through said first and second compartments of said first insulated housing;
   at least one additional insulated housing for treating said goods for baking, said at least one additional housing being successively aligned with said first insulated housing and juxtaposed thereto, said at least one additional insulated housing having a first compartment and a second compartment, each said first and second compartments having an open end and a closed end;
   said first and second compartments of said first insulated housing each having an open end and a closed end;
   first conveyor means disposed adjacent said open ends of said first and second compartments of each of said first insulated and at least one additional insulated housing for transporting said goods for baking to and from each of said first and at least one additional insulated housings, respectively;
   means for conveying said goods for baking from said first conveyor means to said first compartment of each of said housings and from said second compartment of each of said housings to said first conveyor means, said means for conveying juxtaposed said first conveyor means and aligned with said open ends of each said first compartment of said first insulated and at least one additional insulated housings for communication with each of said first compartments, said means for conveying further comprising:
   means for unloading said goods for baking from said first conveyor means, said means for unloading juxtaposed said first conveyor means such that said goods for baking or baked goods are unloaded from said first conveyor means; and
   means for receiving said goods for baking or baked goods from said first conveyor means and sequentially advancing said goods for baking or baked goods along the longitudinal extent of said first compartment of each said first insulated housing and said at least one additional insulated housing, said receiving and sequentially advancing means further comprising:
  first drive means, mounted complementary with said first compartment of each said first insulated housing and said at least one additional insulated housing, for independently transporting each of said goods for baking or baked goods in a substantially vertically aligned stack upward; and
  second drive means mounted complementary with said second compartment of each said first insulated housing and said at least one additional insulated housing for independently transporting each of said goods for baking or baked goods in a substantially vertically aligned stack downwardly;
  depositing means mounted proximate said open end of said second compartment of each said first insulated housing and said at least one additional insulated housing for placing said goods for baking or baked goods onto said first conveyor means; and
  second conveyor means, located proximate said closed end of said first and second compartments of each said first insulated housing and said at least one additional insulated housing, for moving said goods for baking or baked goods from said first compartment to said second compartment whereby said means for conveying transports each of said goods for baking or baked goods from said first conveyor means such that said receiving and sequentially advancing means sequentially stacks said goods for baking or said baked goods trailing a preceding one of said goods for baking in said first compartment by said receiving and sequential advancing means to form a vertical stack as said goods for baking travel upwardly through said first compartment such that said second conveyor means moves said goods for baking or baked goods from said first to said second compartment, whereby further said receiving and sequential advancing means continues to move said goods for baking or baked goods downwardly through said second compartment to said depositing means such that said goods for baking or baked goods are deposited onto said first conveyor means.

2. The plant according to claim 1 wherein said open ends of said first and second compartments of said first insulated housing and said at least one additional insulated housing have oppositely disposed walls having first and second openings therein through which said first conveyor means is disposed.

3. The plant according to claim 1 further comprising programmable control means simultaneously in communication with said first conveyor means, said means for conveying said second conveyor means and said depositing means for regulating continuous movement of said goods for baking through said first insulated housing and said at least one additional insulated housing.

4. The plant according to claim 1 wherein said first insulated housing is a baking oven.

5. The plant according to claim 4 wherein said at least one additional housing is for treating said baked goods, after said goods for baking pass through said baking oven, said at least one additional insulated housing receiving said baked goods from said first conveyor means after said goods for baking have been treated in said first and second compartments of said first insulated housing.

6. The plant according to claim 5 wherein said at least one additional insulated housing in a fermentation compartment.

7. The plant according to claim 5 wherein said at least one additional insulated housing is a cooling tower.

8. A plant according to claim 5 wherein said first insulated housing and said at least one additional housing are juxtaposed each other with a space therebetween.

9. The plant according to claim 1 wherein said means for receiving and sequentially advancing said goods for baking or baked goods further comprises support means for supporting said goods for baking or baked goods while said goods for baking or baked goods proceed through said first insulated housing and said at least one additional insulated housing, said support means being integral with said first and second drive means.

10. A plant according to claim 9 wherein said support means are boxes, and wherein said plant further comprises means disposed adjacent said first conveyor means for placing covers on said boxes.

11. A plant for treating goods for baking comprising:
  a first insulated housing defining a first compartment, a second compartment adjacent to said first compartment, and a means for baking said goods for baking as said goods for baking proceed through said first and second compartments of said first insulated housing;
  at least one additional insulated housing for treating said goods for baking received from said first insulated housing, said at least one additional housing being successively aligned with said first insulated housing and juxtaposed thereto, said at least one additional insulated housing having a first compartment and a second compartment, each said first and second compartments having an open end and a closed end;
  said first and second compartments of said first insulated housing each having an open end and a closed end;
  first conveyor means disposed adjacent said open ends of said first and second compartments of each of said first insulated and said at least one additional insulated housing for transporting said goods for baking to and from each of said first and at least one additional insulated housings, respectively, said first conveyor means extending beyond said first insulated housing and said at least one additional insulated housing;
  means for conveying said goods for baking from said first conveyor means to said first compartment of each of said housings and from said second compartment of each of said housings to said first conveyor means, said means for conveying juxtaposed said first conveyor means and aligned with said open ends of each said first compartment of said first insulated and said at least one additional insulated housings for communication with each of said first compartments, said means for conveying further comprising means for driving said first conveyor means in a forward and rearward direction;

means for unloading said goods for baking from said first conveyor means, said means for unloading juxtaposed said first conveyor means such that said goods for baking or baked goods are unloaded from said first conveyor means; and means for receiving said goods for baking or baked goods from said first conveyor means and sequentially advancing said goods for baking or baked goods along the longitudinal extend of said first compartment of each said first insulated housing and said at least one additional insulated housing, said receiving and sequentially advancing means further comprising:

first drive means, mounted complementary with said first compartment of each said first insulated housing and said at least one additional insulated housing, for independently transporting each of said goods for baking or baked goods in a substantially vertically aligned stack upwardly; and second drive means mounted complementary with said second compartment of each said first insulated housing and said at least one additional insulated housing for independently transporting each of said goods for baking or baked goods in a substantially vertically aligned stack downwardly;

depositing means mounted proximate said open end of said second compartment of each said first insulated housing and said at least one additional insulated housing for placing said goods for baking or baked goods onto said first conveyor means;

second conveyor means, located proximate said closed end of said first and second compartments of each said first insulated housing and said at least one additional insulated housing, for moving said goods for baking or bake goods from said first compartment to said second compartment whereby said means for conveying transports each of said goods for baking or baked goods from said first conveyor means such that said receiving and sequentially advancing means sequentially stacks said goods for baking or said baked goods trailing a preceding one of said goods for baking in said first compartment by said receiving and sequential advancing means to form a a vertical stack as said goods for baking or baked goods travel upwardly through said first compartment such that said second conveyor means moves said goods for baking or baked goods from said first to said second compartment, whereby further said receiving and sequential advancing means continues to move said goods for baking or baked goods downwardly through said second compartment to said depositing means such that said goods for baking or baked goods are deposited onto said first conveyor means; and a programmable control means for transporting said goods for baking and baked goods through said plant according to a predetermined program.

* * * * *

UNITED STATES PATENT AND TRADEMARK OFFICE
CERTIFICATE OF CORRECTION

PATENT NO. : 5,123,336

DATED : June 23, 1992

INVENTOR(S) : Helmut Konig

Page 1 of 2

It is certified that error appears in the above-identified patent and that said Letters Patent is hereby corrected as shown below:

Title page, title, delete "BAKING GOOD" and insert ---- BAKED GOODS ---- . (Item 54)

Column 1, line 1, delete "BAKING GOOD" and insert ---- BAKED GOODS ---- .

Column 1, line 6, delete "treated" and insert ---- treating ---- .

Column 1, line 20, delete "top" and insert ---- to ---- .

Column 2, line 28, delete "e" and insert ---- be ---- .

Column 2, line 37, delete "member" and insert ---- members ---- .

Column 2, line 19, after "room" insert ---- baking ---- .

Column 3, line 14, after "individual" insert ---- treating ---- .

Column 4, line 19, delete "cover" and insert ---- covers ---- .

Column 6, line 63, delete "14" and insert ---- 4 ---- .

UNITED STATES PATENT AND TRADEMARK OFFICE
CERTIFICATE OF CORRECTION

PATENT NO. : 5,123,336

DATED : June 23, 1992

INVENTOR(S) : Helmut Konig

It is certified that error appears in the above-indentified patent and that said Letters Patent is hereby corrected as shown below:

Column 7, line 5, after "oven" insert ---9---.

Column 11, line 11, delete "upward" and insert ---upwardly---.

Column 12, line 10, delete "in" and isnert ---is---.

Column 13, line 11, delete "extend' and insert --extent--.

Column 14, line 7 delete "bake" and insert --baked---.

Signed and Sealed this

First Day of February, 1994

Attest:

BRUCE LEHMAN

Attesting Officer     Commissioner of Patents and Trademarks